(12) United States Patent
Goto et al.

(10) Patent No.: US 6,744,445 B2
(45) Date of Patent: Jun. 1, 2004

(54) REPEATER

(75) Inventors: Teiyu Goto, Tokyo (JP); Kazusato Tagawa, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 407 days.

(21) Appl. No.: 09/764,495

(22) Filed: Jan. 17, 2001

(65) Prior Publication Data

US 2001/0009564 A1 Jul. 26, 2001

(30) Foreign Application Priority Data

Jan. 20, 2000 (JP) .................................. 2000-012281

(51) Int. Cl.[7] .............................................. G06T 11/00
(52) U.S. Cl. ....................................................... 345/719
(58) Field of Search ................................ 345/750, 161, 345/503, 532, 536, 960, 970.1; 439/157, 364, 61; 361/695; 463/43, 47; 725/145; 709/219; D14/100

(56) References Cited

U.S. PATENT DOCUMENTS

| D370,210 S | * | 5/1996 | Cindrich et al. ............ D14/100 |
| 5,695,362 A | | 12/1997 | Hillbish et al. |
| 5,785,597 A | | 7/1998 | Shinohara |
| 6,095,845 A | * | 8/2000 | Murphy ....................... 439/364 |

FOREIGN PATENT DOCUMENTS

| DE | 40 13 991 A1 | 11/1991 |
| EP | 0 548 942 | 6/1993 |
| EP | 0 548 942 A1 | 6/1993 |
| EP | 0 665 038 A1 | 8/1995 |
| EP | 0 665 038 | 8/1995 |
| EP | 0431724 | 7/1996 |
| EP | 0 903 680 | 3/1999 |
| EP | 0 903 680 A2 | 3/1999 |
| JP | 08-191951 | 7/1996 |
| TW | 17046 | 3/1997 |

* cited by examiner

*Primary Examiner*—Almis R. Jankus
(74) *Attorney, Agent, or Firm*—Katten Muchin Zavis Rosenman (57) ABSTRACT

A repeater has multiple operation terminal connections to which operation terminals are connected, multiple external memory device connections that are set in correspondence with the operation terminal connections and to which external memory devices are connected, and a main body connection terminal with which an electronic device main body is connected. The repeater makes possible communication between electronic device main body and connected operation terminals and external memory devices. An independent operation terminal communication system and an independent external memory device communication system are integrated into a main body connection terminal, hereby enabling simultaneous connection of such communication systems with the operation terminal connection and memory device connection on the electronic device main body.

9 Claims, 7 Drawing Sheets

REPEATER

FIELD OF THE INVENTION

This invention concerns a repeater that can be used, for example, with an entertainment device operated by multiple persons, and more particularly to a repeater having multiple operation terminal connections to which operation terminals are connected, multiple external memory device connections that are set to correspond to the operation terminal connections and to which external memory devices are connected, and a main body connection terminal to be connected to an electronic device main body, said repeater making communication possible between the connected operation terminals and external memory devices and the electronic device main body.

BACKGROUND OF THE INVENTION

An electronic device such as an entertainment device for home use has heretofore been conventionally constructed in such a way that a controller or other operation terminal is connected to the main body of the device, and a memory card or other external memory device that stores various data concerning the operating environment of the operation terminal or the state of the game being played on the entertainment device is also connected to the main body of the device.

Meanwhile, in recent years, in order to allow multiple persons to play a game simultaneously, devices have become known in which, without directly connecting an operation terminal to the entertainment device main body, a repeater is connected to the entertainment device main body, and operation terminals can be multiply connected simultaneously to this repeater. If such a repeater is used, multiple operation terminals can be connected to a single repeater, which confers the advantage that game diversification can be done, with multiple persons playing a game with the entertainment device.

But in an entertainment device in which multiple operation terminals can be connected to the device main body simultaneously through such a repeater, heretofore an external memory device has been directly connected to the device main body. Therefore there is the problem that if the individual data of each operation terminal is to be stored in the external memory device, it is necessary to partition the memory region of the external memory device and record the individual data in each memory region, and reconnect the external memory device to each operation terminal and record it, and the external memory device must be reinserted for each operation terminal that is unable to secure enough memory region.

Thus technology has been proposed that provides alleviation of the complicated nature of reinserting external memory devices and secures a memory region for each operation terminal, by providing on the repeater a number of external memory device connections that correspond to the operation terminals to be connected and connecting external memory devices corresponding to the number of operation terminals to be connected to these external memory device connections (see unexamined patent H8-191951 [1996]).

But with the above-disclosed prior art technology, the entertainment device main body and repeater are connected by one communication system. With signals input to the repeater through this communication system, it must first be decided within the repeater whether a signal is for an operation terminal or for an external memory device, then the signal is output to an operation terminal or an external memory device, and this composition entails the problem that it takes time for this communication.

In particular, with the faster speed of central processing devices in recent years, there is a need for a repeater in which high-speed communication can be performed with the entertainment device main body and which is simple to connect to the device main body. The purpose of this invention is to provide a repeater that ensures high-speed communication between the electronic device main body and the operation terminal or external memory device, and which is simple to connect to the electronic device main body.

SUMMARY OF THE INVENTION

A repeater is provided with multiple operation terminal connections to which operation terminals are connected, multiple external memory device connections that are set to correspond to the operation terminal connections and to which external memory devices are connected, and a main body connection terminal to be connected to an electronic device main body, and that makes communication possible between the connected operation terminals and external memory devices and said electronic device main body. Communication between the repeater and the electronic device main body is done by independent operation terminal communication system and external memory device communication system, and said main body connection terminal is constituted by the integration of an operation terminal communication terminal that constitutes said operation terminal communication system and an external memory device communication terminal that constitutes said external memory device communication system. The operation terminal communication system and external memory device communication system are constituted independently, so signal input and output can be done separately between the electronic device main body and operation terminals and external memory devices, and high-speed communication can be realized via the repeater between the operation terminals or external memory devices and the electronic device main body.

DETAILED DESCRIPTION OF THE PREFERRED EMBODIMENTS

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

Figure 1:
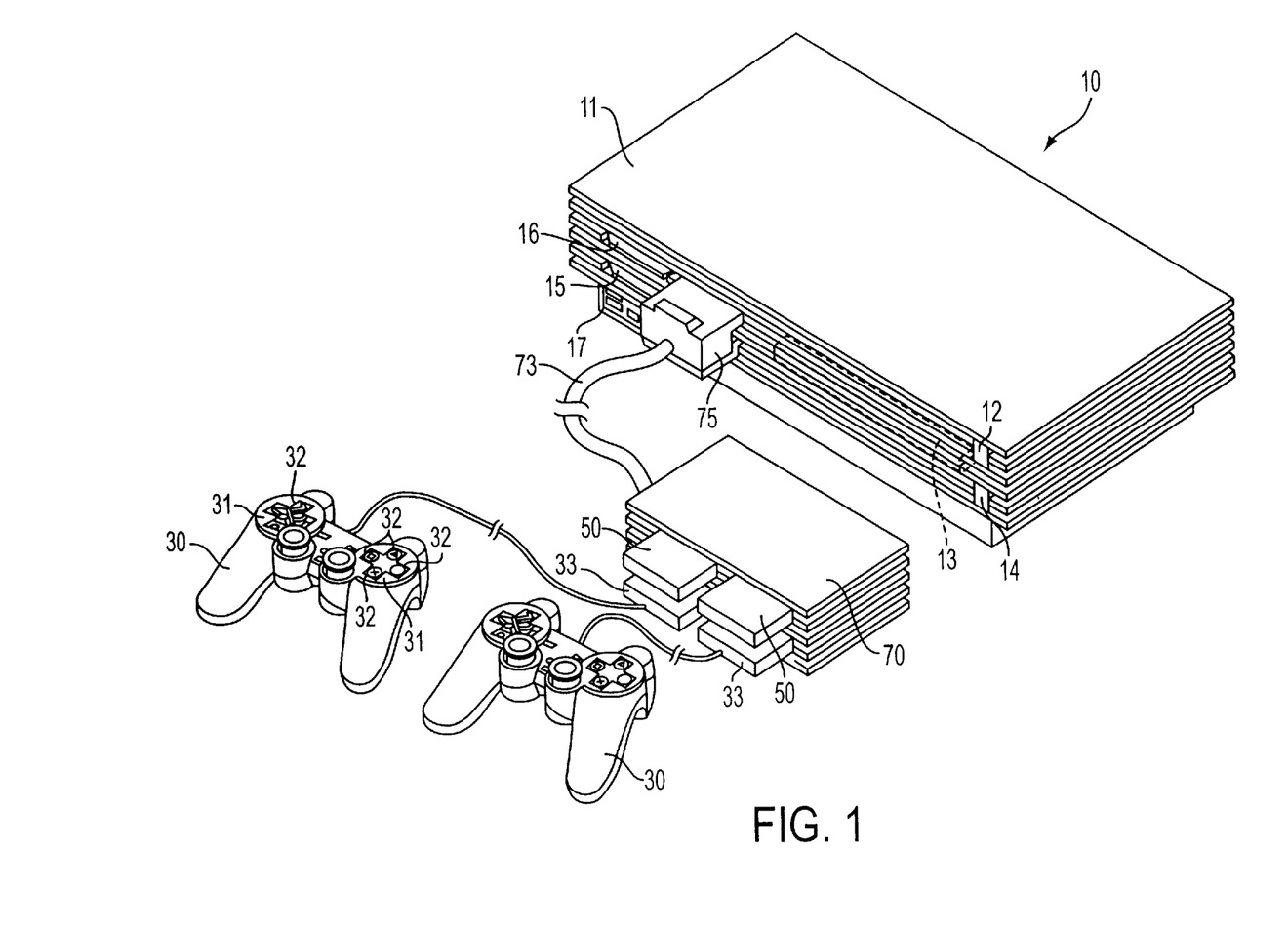
FIG. 1 is a perspective view of an entertainment device incorporating the repeater of the present invention.

FIG. 1 illustrates an entertainment device consisting of a device main body 10, a plurality of controllers 30, each of which serves as a control terminal, a plurality of memory cards 50, each of which serves as an external memory device, and a repeater 70. The device main body 10, which is conventionally connected with an audiovisual output device (not shown), has the function of reading games, images, and other application programs stored on an optical disk, etc., and executing said programs by displaying them on said audiovisual output device according to instructions given by the operator using a controller 30. The device main body 10 further comprises a main board, power source unit, disk device, and input-output signal control board (all not shown), which are housed inside cabinet 11. The main board (not shown), which controls the device as a whole, has a control system (not shown) consisting of a CPU and its peripheral devices, a graphic system (not shown) that includes a GPU that draws images, and a sound system that plays music and sound effects, etc. The power source unit (not shown), which supplies power to the peripheral devices inside the entertainment device also supplies a power to the controller 30, memory card 50, and repeater 70, which are connected to the device main body 10. This power source unit can be manipulated by turning on the master switch (not shown) on the back of cabinet 11 and operating switch 12 on the right side of cabinet 11. The disk device, which plays CD-ROMs, DVD-ROMs, and other optical disks, has a main body that includes an optical pickup unit (not shown) arranged inside cabinet 11 and a disk tray 13 by which to load an optical disk in the main body, with the end face of disk tray 13 being exposed on the front right side of cabinet 11. The disk tray 13 is operated by switch 14 located beside the disk tray 13. The input-output signal control board (not shown) has an optical disk controller that controls the optical disk on which application programs are recorded, and a communication controller that performs communication between the entertainment device main body 10 and external devices. The optical disk controller has, for example, a decoder that decodes programs or data, etc. recorded with an appended error correction code, and a buffer that speeds up the reading of data from the optical disk by temporarily recording data from the disk device. Connected to the communication controller are controller connection 15 and card slot 16, which are arranged on the device 10 shown in FIG. 1 on the front left side of cabinet 11 and, arranged below them, external device connection 17, which is USB compliant. The communication controller performs communication control with the external devices connected to these connections. Also provided on device main body 10 of FIG. 1 are a PCMCIA slot (not shown) and an audiovisual output terminal (not shown), and these too are connected to the communication controller and are similarly controlled.

As shown in FIG. 1, controller 30, which serves as an operation terminal and outputs operation signals to device main body 10, has a main body 31, operation switches 32, which are preferably arranged on the top and side of controller main body 31, and a connection terminal 33 for connecting with repeater 70 or entertainment device main body 10 directly. As an external memory device, memory card 50 has flash memory mounted on the board and a case that houses the board including this flash memory, and an electrically conductive pattern is formed on the end of the board as is known in the art. In other words, a card edge connector by which electrical connection is made is adopted as the connection structure of memory card 50, by inserting said board end into the prescribed socket, for example card slot 16 of entertainment device main body 10. The state of progress and settings of a game or other application can be recorded on this memory card 50, and when a game ends, signals are output from entertainment device main body 10 to memory card 50 in order to preserve the state. And when a game that has been paused is resumed at a later date, when entertainment device main body 10 starts, the information recorded on this memory card 50 is loaded or transferred into entertainment device main body 10.

Figure 2:
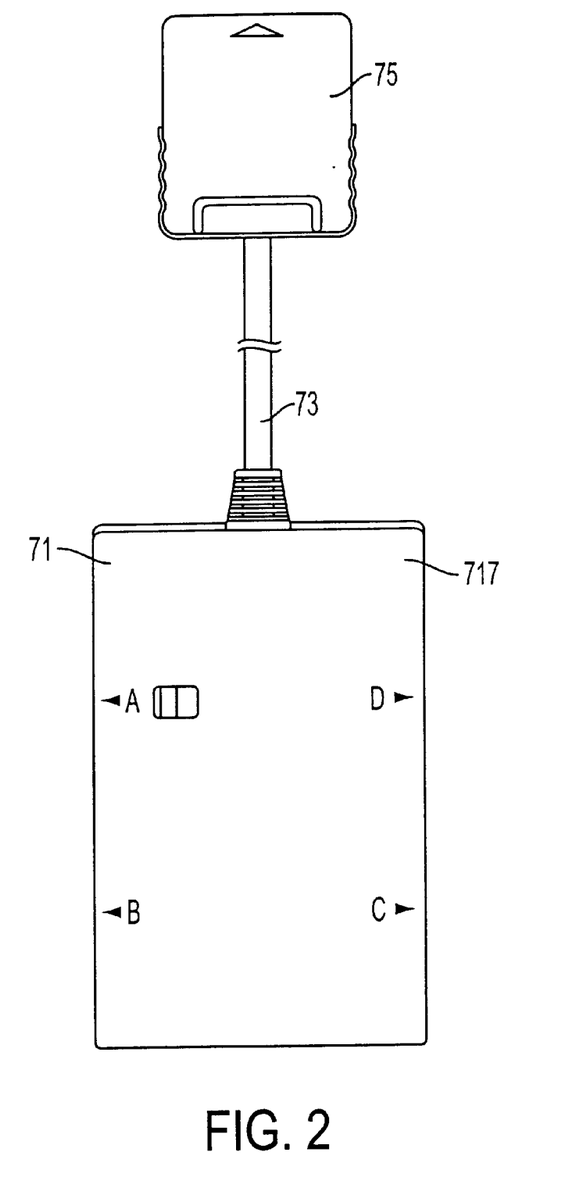
FIG. 2 is a plan view of the repeater of the present invention.
Figure 3:
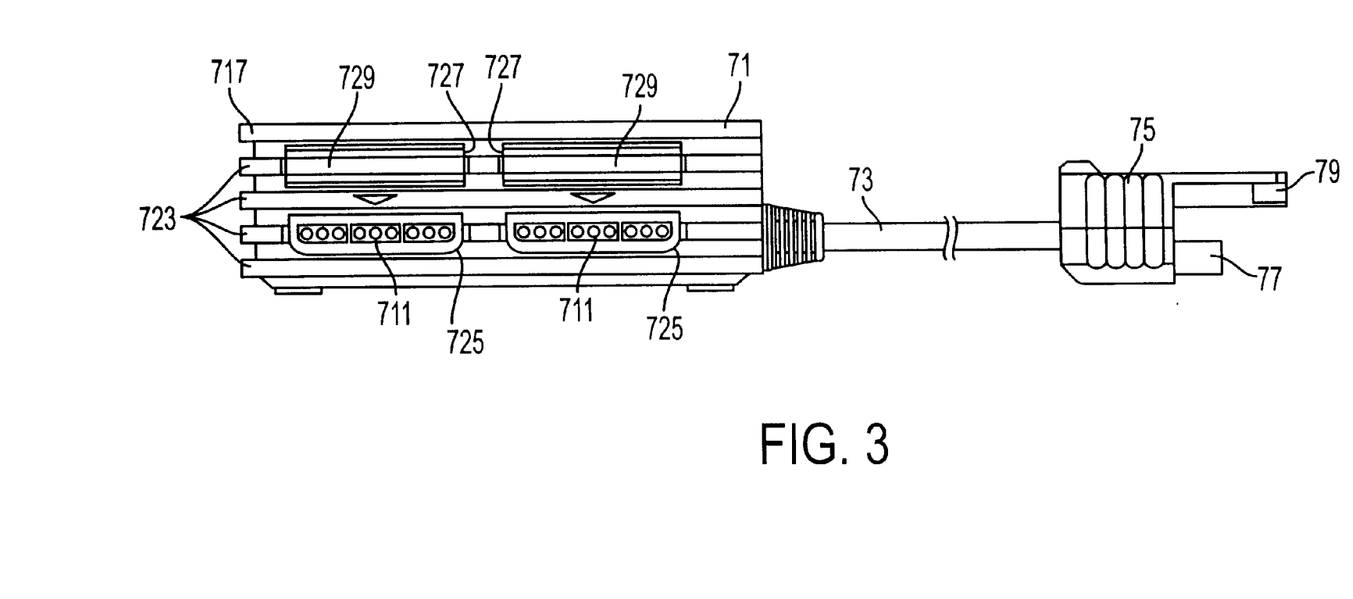
FIG. 3 is a side view of the repeater of FIG. 2.
Figure 4:
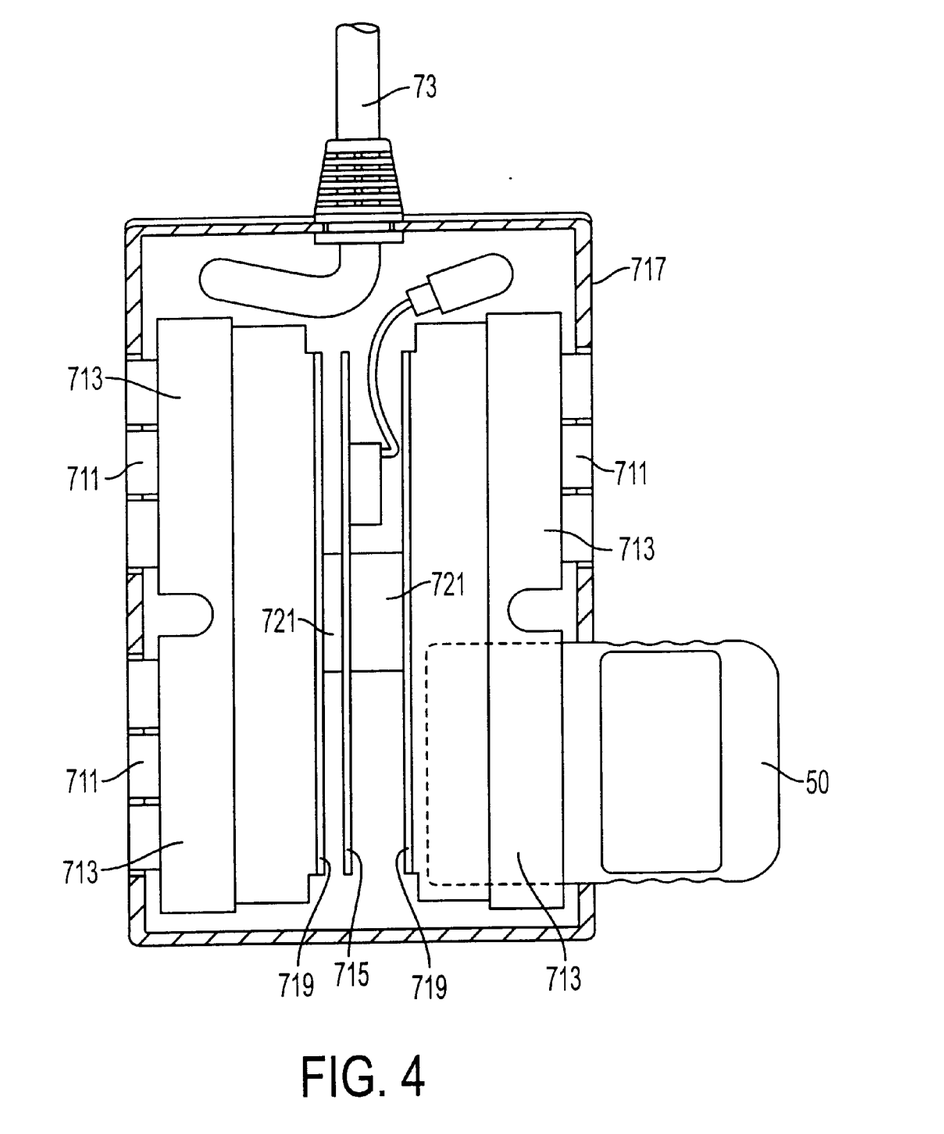
FIG. 4 is a horizontal cross-sectional view of the internal structure of the repeater of FIG. 2.

As shown in FIGS. 2–4, repeater 70 has a main body 71, cable 73, and a main body connection terminal 75. Repeater main body 71 preferably consists of a cabinet 717 that houses four controller connections 711, four card slots 713 and control board 715. Each controller connection 711 has the same structure as controller connection 15 of entertainment device main body 10, and each card slot 713 has the same structure as card slot 16 of entertainment device main body 10. Attached to controller connections 711, which serve as the operation terminal connections, are connection terminals 33 of said controller 30 (see FIG. 1). Card slots 713, which serve as the external memory device connections, are provided at the top of controller connections 711 corresponding to the arrangement of said controller connections 711, and memory cards 50 are inserted and connected thereto. Such controller connections 711 and card slots 713 are attached on two boards 719, which are arranged approximately symmetrically about cable 73 in the center, i.e., the pair of controller connections 711 and the pair of card slots 713 are arranged mutually facing the back surface part, and this combination is arranged in two rows in a direction perpendicular to the facing direction (see FIG. 4). The two controller connections 711 and card slots 713 that constitute each row are electrically connected by boards 719, and are connected to control board 715 through connector 721.

Figure 5:
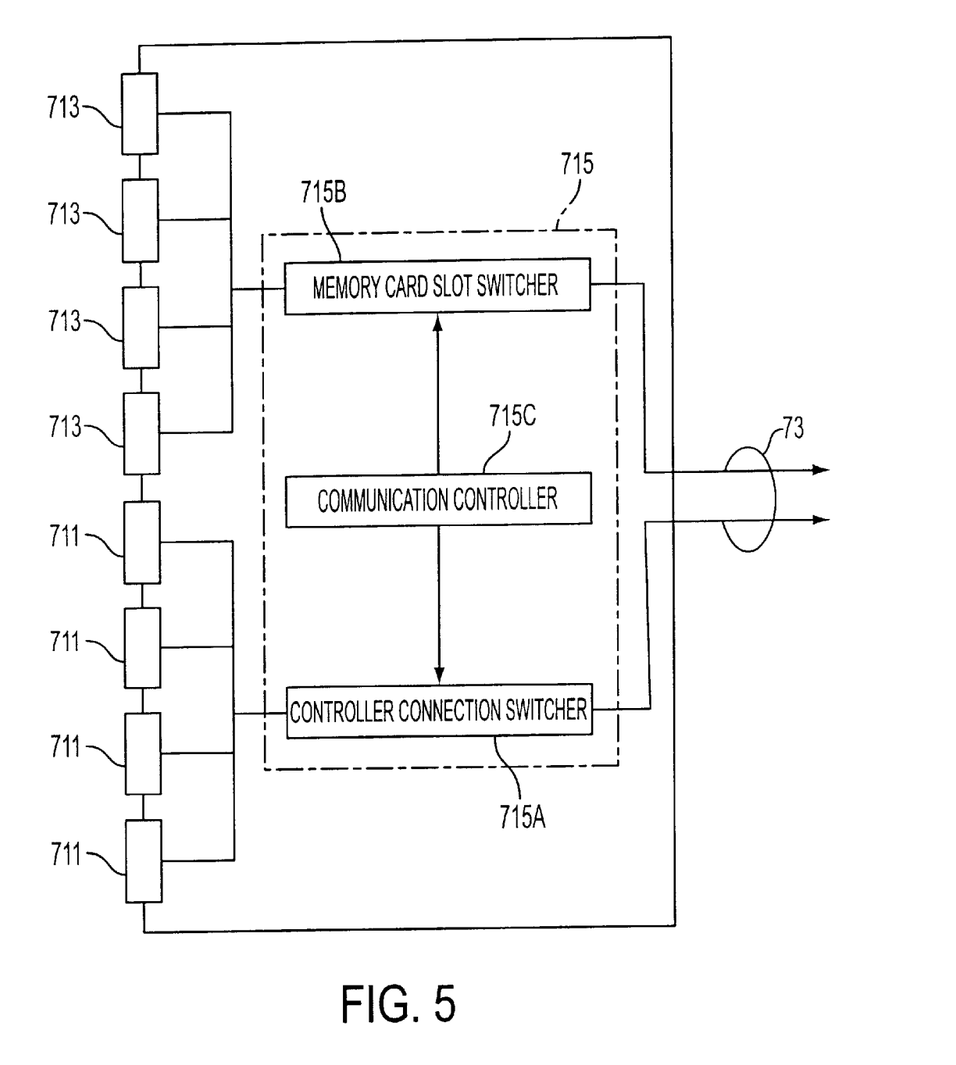
FIG. 5 is a block diagram of the structure of the communication systems on the repeater of the present invention.

As shown in FIG. 5, control board 715 has controller connection switcher 715A, which is electrically connected with controller connections 711, memory card slot switcher 715B, which is electrically connected with card slots 713, and communication controller 715C, which controls the communication of the switchers 715A and 715B. Controller connection switcher 715A is connected with any of the four controller connections 711 and with controller connection 15 of entertainment device main body 10. Memory card slot switcher 715B is connected with any of the four card slots 713 and with card slot 16 of entertainment device main body 10. Communication controller 715C receives commands from entertainment device main body 10 and controls controller connection switcher 715A and memory card slot switcher 715B.

That is, a controller communication system that includes said controller connection 15 and the four controller connections 711, and a memory card communication system that includes said card slot 16 and the four card slots 713, are constituted as independent communication systems, and communication controller 715C performs switching control of such communication systems. Therefore within cable 73 as well, the two systems are set up independently and exchange signals with entertainment device main body 10. In other words, control signals from entertainment device main body 10 are supplied via the controller communication system to communication controller 715C, and the composition is such that based on these signals, switching of controller connection switcher 715A and memory card slot switcher 715B is done by communication controller 715C.

Return now to FIGS. 2 and 3, repeater cabinet 717 consists of a rectangular box-shaped body having on its side a relief pattern of multiple protruding horizontal stripes 723. Openings 725 and 727 are formed along protruding stripes in positions corresponding to the arrangement of controller connections 711, and controller connections 711 are exposed through them. Openings 727 are formed in positions corresponding to the arrangement of card slots 713 and are covered by cover members 729, which open and close when a memory card is inserted and pulled out.

Figure 6:
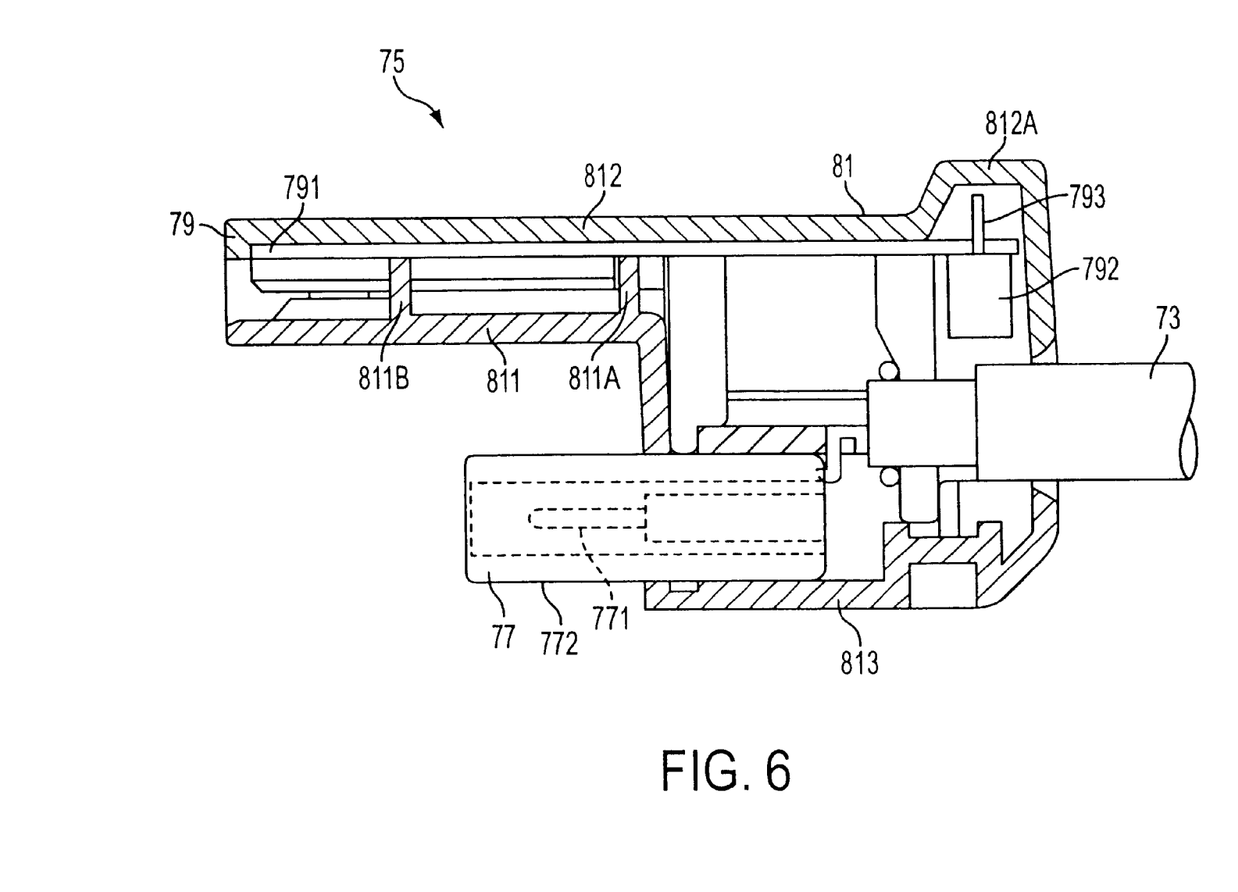
FIG. 6 is a vertical cross-sectional view of the structure of the main body connection terminal of the repeater of the present invention.

As shown in FIG. 6, main body connection terminal 75 has controller communication terminal 77, which serves as the operation terminal communication terminal that is connected with controller connection 15 of entertainment device main body 10, and memory communication terminal 79, which serves as the external memory device communication terminal that is connected with card slot 16, and housing case 81, which houses controller terminals 75 and 79 into an integrated unit. Controller communication terminal 77 has multiple plug pins 771 within housing 772, and the base ends of plug pins 771 are connected with signal wires inside cable 73. Controller communication terminal 77 is electrically connected via cable 73 with controller connection switcher 715A of repeater 70 and is constituted as part of the controller communication system. Memory communication terminal 79 has board 791, in which multiple electrically conductive patterns are formed on the insertion direction end in the same way as memory card 50, and signal wire connectors 792, which are mounted on this board 791 and to which multiple signal wires (not pictured) inside cable 73 are connected. Memory communication terminal 79 is electrically connected via cable 73 with memory slot switcher 715B of repeater 70 and is constituted as part of the memory card communication system. Although not pictured in FIG. 6, the electrically conductive pattern of board 791 is formed on its lower surface and is electrically connected to signal wire connectors 792 by a wiring pattern formed in correspondence to the electrically conductive patterns. Signal wire connectors 792 are attached to the lower surface of board 791 and are held in place by inserting multiple pins 793 into holes formed in board 791. Thus the upper ends of pins 793 protrude from the upper surface of board 791.

Housing case 81 is a three-layer structure that has center chassis 811, which holds controller communication terminal 77 and memory communication terminal 79, an upper case 812, which accommodates memory communication terminal 79 on center chassis 811, and a lower case 813, which accommodates controller communication terminal 77. Center chassis 811 has a crank-shaped cross-section; multiple ribs 811A that support board 791 are formed on the horizontal part of its insertion direction end side, and multiple guide ribs 811B for directing the main body connection terminal into the prescribed position of said card slot 16 are formed on the insertion part into card slot 16. Cable 73 is attached to the base end part of center chassis 811. On upper case 812, bulging part 812A is formed on the insertion direction base end part and protrudes farther out than the external shape of the mounting part of the tip of upper case 812 with card slot 16. Pins 793 of connectors 792 are accommodated in an expanded space inside bulging part 812A. Lower case 813 supports controller communication terminal 77, which is held in housing 772 between the lower surface of center chassis 811 and the upper surface of lower case 813. Because the controller communication terminals 77 and memory communication terminals 79 are covered by a housing case, the terminal part of each connection can be kept from being deformed by external forces and the occurrence of bad contact due to the adhesion of dust, etc. can be prevented, and because the housing case is made with a three-layer structure, the strength of the housing case as a whole is improved, which is further advantageous for preventing deformation of the terminal part, etc.

Figure 7:
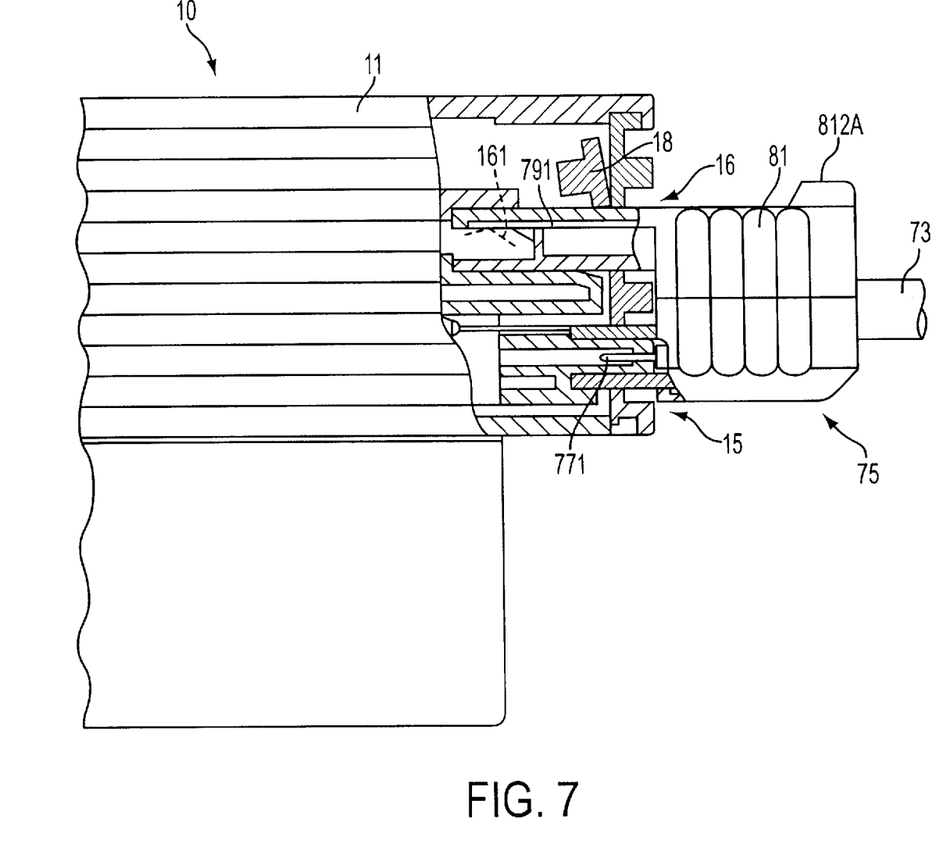
FIG. 7 is a vertical cross-sectional view showing the main body connection terminal of FIG. 6 mounted on an electronic device main body.

As shown in FIG. 7, main body connection terminal 75 enables, by a one-time connection operation, the electrical connection of controller communication terminal 77 with controller connection 15 and the electrical connection of memory communication terminal 79 with card slot 16 of main body 10. That is, controller communication terminal 77 is inserted into controller connection 15 with plug pins 771 engaging a jack inside controller connection 15, and memory communication terminal 79 is inserted into card slot 16 (by rotating cover member 18 out of the way) at the same time as the connection of controller communication terminal 77 is made with controller connection 15, with the lower surface of board 791 engaging the socket part of card slot 16 so that contact is made between the electrically conductive pattern at the end of board 791 and metal spring material 161 provided on the card edge socket part. To remove main body connection terminal 75 from the entertainment device main body 10, one holds the base end part of connection terminal 75 in the same way as above pulls out horizontally with one's finger also on bulging part 812A so that controller communication terminal 77 and memory communication terminal 79 can be pulled out from controller connection 15 and card slot 16 simultaneously. Thus, due to the construction of the bulging part 812A, it is easy to insert and retract the main body connection terminal from the electronic device main body.

With the above described embodiment of the present invention, controller communication and the memory card communication systems are constituted independently, i.e., the input and output of signals can be done separately between entertainment device main body 10 and controller 30 and between entertainment device main body 10 and memory card 50, and high-speed communication can be realized via repeater 70 between controller 30 or memory card 50 and device main body 10. However, by using body connection terminal 75, the controller communication terminal 77 and memory communication terminal 79 may be housed in a single case and connected to the device main body 10 in a single operation.

Also, because a relief pattern consisting of multiple protruding stripes 723 is formed on repeater main body 71 and protruding stripes 723 are formed along openings 725 and 727, controller connections 711 can be exposed aligned with the relief pattern, and the appearance of repeater 70 can be improved. In addition, because multiple controller connections 711 and multiple card slots 713 are arranged within cabinet 717 so that their back parts face each other, the shape of cabinet 717 can be simplified and repeater 70 can be made smaller. And because control board 715 is arranged between controller connections 711 and card slots 713, which face each other, control board 715, controller connections 711, and card slots 713 can be connected by a simple part, namely connector 721, and the connection structure can be simplified.

While an embodiment of the invention is described above, such embodiment may include modifications. For example, the repeater cabinet may assume a shape different than a rectangular parallelepiped, and controller connections and card slots may be arranged in different locations. The connection terminals may constitute other structures than cards, pins and the like. As long as it is the same connection structure as the connection structure adopted for the controllers or other operation terminals and the memory cards or other external memory devices, then another connection structure can be adopted for the operation terminal communication terminal and the external memory device communication terminal.

In addition, while in the aforesaid embodiment, the control signals from entertainment device main body 10 to communication controller 715C of repeater 70 are supplied through the controller communication system, such signals may be supplied using the memory card communication system.

Also, while the repeater is described in connection with an entertainment device, it may be used with other electronic devices, such as a personal computer or the like.

Besides this, as to the specific structure and shape, etc. when implementing this invention, other structures, etc. may be adopted as long as they accomplish the purpose of this invention.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

We claim:

1. A repeater for use with an electronic device, said electronic device having an operation terminal connection and an external memory device connection, said repeater comprising:
   a) a plurality of operation terminal connections to which operation terminals are connected,
   b) a plurality of external memory device connections adapted to correspond to said plurality of operation terminal connections and to which external memory devices are connected, and
   c) a main body connection terminal adapted for connection to said electronic device and that makes communication possible between connected operation terminals and connected external memory devices with said electronic device,
   d) wherein communication between said plurality of operation terminal connections through an operation terminal communication system and said electronic device occurs independent of communication between said plurality of external memory device connections through an external memory device communication system and said electronic device, and
   e) wherein said operation terminal communication system and said external memory device communication system are integrated in said main body connection terminal.

2. A repeater in accordance with claim 1, wherein said operation terminal communication system further comprises an operation terminal communication terminal and wherein said external memory device communication system further comprises an external memory device communication terminal, said operation terminal communication terminal adapted for connection with said operation terminal connection of said electronic device, and said external memory device communication terminal adapted for connection with said external memory device connection of said electronic device.

3. A repeater in accordance with claim 2, wherein said connection between said operation terminal communication terminal and said operation terminal connection of said electronic device occurs simultaneously with said connection between said external memory device communication terminal and said external memory device connection of said electronic device.

4. A repeater in accordance with claim 1, wherein said main body connection terminal further comprises a first housing unit for accommodating said operation terminal communication system and a second housing unit for accommodating said external memory device communication system.

5. A repeater in accordance with claim 4, wherein said first and second housing units are independent from each other and housed within a housing case.

6. A repeater in accordance with claim 5, wherein said housing case has a bulging part for manual manipulation of said main body connection terminal.

7. A repeater in accordance with claim 1, wherein said repeater is housed within a cabinet having a relief pattern of multiple protruding stripes that extend in the same direction an arranged on at least one face of said cabinet.

8. A repeater in accordance with claim 7, wherein said cabinet further comprises multiple openings formed along the protruding stripes through which are exposed said plurality of operation terminal connections and said plurality of multiple external memory device connections.

9. A repeater in accordance with claim 1, further comprising a control board for controlling output of signals from said plurality of operation terminal connections and said plurality of external memory device connections.

* * * * *